(12) United States Patent
Sun et al.

(10) Patent No.: US 11,902,003 B2
(45) Date of Patent: *Feb. 13, 2024

(54) UPLINK TRANSMIT BEAM SWEEP (71) Applicant: Apple Inc., Cupertino, CA (US)

(72) Inventors: Yakun Sun, San Jose, CA (US); Anatoliy S. Ioffe, Redwood City, CA (US); Ehsan Haghani, Redwood City, CA (US); Rohit U. Nabar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/548,100

(22) Filed: Dec. 10, 2021

(65) Prior Publication Data

US 2022/0103238 A1 Mar. 31, 2022

Related U.S. Application Data

(63) Continuation of application No. 16/671,881, filed on Nov. 1, 2019, now Pat. No. 11,201,662.

(60) Provisional application No. 62/755,212, filed on Nov. 2, 2018.

(51) Int. Cl.
*H04B 7/08* (2006.01)
*H04W 16/28* (2009.01)
*H04L 25/02* (2006.01)
*H04L 5/00* (2006.01)
*H04W 72/23* (2023.01)

(52) U.S. Cl.
CPC ........... *H04B 7/088* (2013.01); *H04L 5/0048* (2013.01); *H04L 25/0226* (2013.01); *H04W 16/28* (2013.01); *H04W 72/23* (2023.01)

(58) Field of Classification Search
CPC ...... H04B 7/088; H04W 72/23; H04W 16/28; H04L 5/0048; H04L 25/0226
See application file for complete search history.

(56) References Cited

U.S. PATENT DOCUMENTS

| 10,666,342 | B1 * | 5/2020 | Landis | H04B 17/318 |
| 2015/0009951 | A1 | 1/2015 | Josiam et al. | |
| 2016/0192341 | A1 | 6/2016 | Park et al. | |
| 2018/0049116 | A1 | 2/2018 | Islam et al. | |
| 2018/0131434 | A1 | 5/2018 | Islam et al. | |
| 2018/0131486 | A1 * | 5/2018 | Liu | H04B 7/063 |

(Continued)

FOREIGN PATENT DOCUMENTS

| EP | 3644522 A1 * | 4/2020 | ........... H04B 7/0626 |
| WO | WO-2017196612 A1 * | 11/2017 | ........... H04B 7/0404 |

(Continued)

*Primary Examiner* — Kevin D Mew
(74) *Attorney, Agent, or Firm* — FLETCHER YODER PC (57) ABSTRACT

Systems and methods related to partial beam correspondence may be used to address potential limitations of beamforming wireless networks. A user equipment electronic device and/or wireless network identifies a subset of available transmitter beams for the user equipment electronic device that are indicated as similar to a downlink reference signal received at the user equipment electronic device from a wireless network node. The user equipment electronic device sweeps the subset of available transmitter beams for communication with the wireless network node and uses a best beam from the sweep to communicate with the wireless network node.

20 Claims, 9 Drawing Sheets

(56) References Cited

U.S. PATENT DOCUMENTS

| | | | |
|---|---|---|---|
| 2018/0199258 A1 | | 7/2018 | Cezanne et al. |
| 2018/0227035 A1 | | 8/2018 | Cheng et al. |
| 2018/0227094 A1 | | 8/2018 | Liu et al. |
| 2018/0302888 A1 | | 10/2018 | Stirling-Gallacher et al. |
| 2019/0053271 A1 | * | 2/2019 | Islam ................ H04W 74/0866 |
| 2019/0053320 A1 | | 2/2019 | Islam et al. |
| 2019/0069219 A1 | | 2/2019 | Stjernholm |
| 2019/0116605 A1 | | 4/2019 | Luo et al. |
| 2019/0124639 A1 | * | 4/2019 | Nilsson ............... H04W 72/046 |
| 2019/0140714 A1 | * | 5/2019 | Tan ..................... H04B 7/0695 |
| 2019/0222279 A1 | | 7/2019 | Xi et al. |
| 2019/0305830 A1 | * | 10/2019 | Zhou .................. H04B 7/0697 |
| 2019/0320336 A1 | * | 10/2019 | Takano ................ H04W 16/28 |
| 2020/0007196 A1 | | 1/2020 | Cao |
| 2020/0037297 A1 | | 1/2020 | Pan et al. |
| 2020/0106168 A1 | * | 4/2020 | Hakola .................. H01Q 1/246 |
| 2020/0145080 A1 | | 5/2020 | Tang et al. |
| 2020/0145090 A1 | | 5/2020 | Sun et al. |
| 2020/0153498 A1 | | 5/2020 | Kotecha et al. |
| 2020/0177266 A1 | | 6/2020 | Kang et al. |
| 2020/0266867 A1 | | 8/2020 | Park et al. |
| 2021/0119688 A1 | | 4/2021 | Enescu et al. |

FOREIGN PATENT DOCUMENTS

| | | | | |
|---|---|---|---|---|
| WO | WO-2019004694 A1 | * | 1/2019 | ........... H04B 7/0695 |
| WO | WO-2020020453 A1 | * | 1/2020 | ........... H04B 7/0617 |

* cited by examiner

UPLINK TRANSMIT BEAM SWEEP

CROSS-REFERENCE TO RELATED APPLICATIONS

This application is a continuation of U.S. patent application Ser. No. 16/671,881, entitled "Uplink Transmit Beam Sweep," filed Nov. 1, 2019, which claims priority to U.S. Provisional Patent Application No. 62/755,212, entitled "Uplink Transmit Beam Sweep," filed Nov. 2, 2018, each of which is incorporated herein in its entirety for all purposes.

BACKGROUND

The present disclosure relates generally to enhancing an uplink transmitter beam sweep.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The $3^{rd}$ Generation Partnership Project (3GPP) defines various standards as part of the duties of the collaborative organization. For example, 3GPP has defined a 5G New Radio (NR) Frequency Range 2 (FR2) specification telling the UE and a Next Generation NodeB (gNB) how to communicate using 5G communications. The 3GPP NR FR2 specifies that the UE may support beam correspondence such that the UE the uplink transmitter beam based on downlink measurements of a downlink reference signal. When no beam correspondence exists, the UE sweeps uplink transmitter beam through sounding reference signal (SRS) transmissions, and the gNB selects and indicates the UE.

A 3GPP NR FR2 link is in centimeter or millimeter wave band and relies on beamforming for the connection. From the UE's perspective, the UE supports beam correspondence or no-beam correspondence. Beam correspondence (BC) indicates that the UE may select the uplink transmitter beam based on downlink measurements of a downlink reference signal. In no-beam correspondence (NBC), the UE instead sweeps the uplink transmitter beam through SRS transmissions, and the gNB selects and indicates the UE. The term "beam" is equivalent to "spatial domain transmission filter" or "spatial filter" as used in 3GPP specs.

In Release15 of 3GPP's beamforming framework, both BC and NBC are supported. For BC, multiple sounding reference signal (SRS) resources are configured, each with a spatial relation with a downlink reference signal (RS), such as synchronization signal blocks (SSB) or channel state information reference signal (CSIRS). For NBC, multiple SRS resources are configured, each without a spatial relation configured. Accordingly, the UE may be configured with both SRS resources with and without spatial relations.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

In beamforming electronic devices, the electronic device attempts to use a best beam with a highest fidelity connection to communicate with wireless network nodes. In certain situations, conditions may exist that cause the best beam for a wireless devices to change even when beam correspondence (BC) indicates that the previously used beam is the best beam. To accommodate for beam changes, BC restrictions may be lessened. Specifically, a subset of beams may be indicated as similar to an incoming beam to enable switching between the beams without requiring a complete sweep of all beams.

Figure 1:
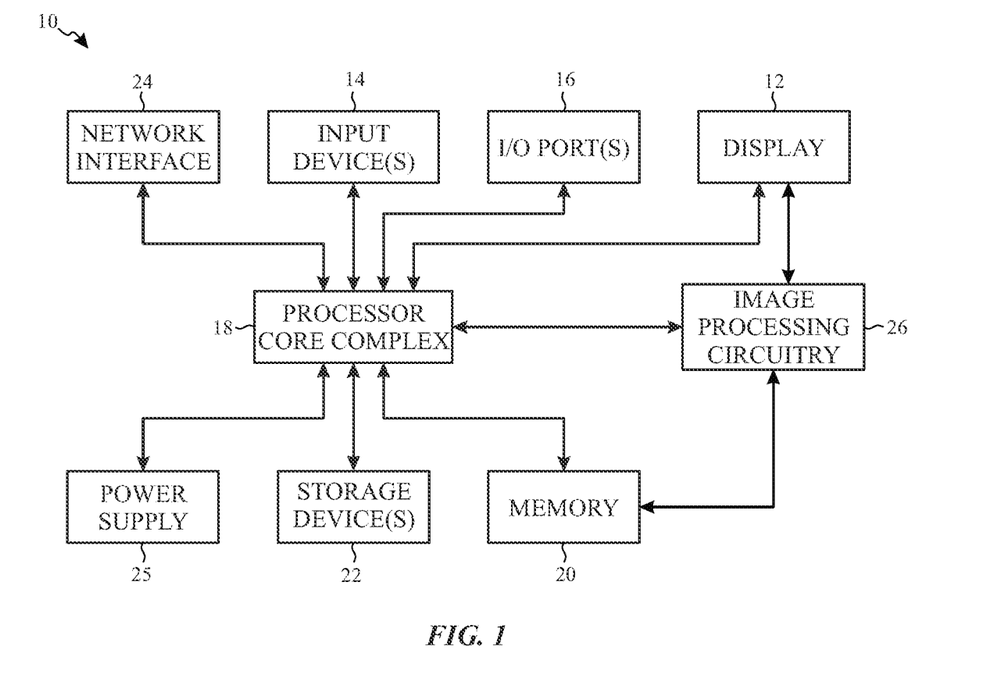
FIG. 1 is a block diagram of an electronic device used to communicate with a base node (gNB), in accordance with an embodiment of the present disclosure.

With the foregoing in mind, an electronic device 10 using beamforming may be any suitable electronic device, such as a computer, a mobile phone, a portable media device, a wearable device, a tablet, a television, a virtual-reality headset, a vehicle dashboard, and the like. Thus, it should be noted that FIG. 1 is merely an example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, and a power source 25. The various components described in FIG. 1 may include hardware elements (e.g., circuitry), software elements (e.g., a tangible, non-transitory computer-readable medium storing instructions), or a combination of both hardware and software elements. It should be noted that, in some embodiments, the various depicted components may be combined into fewer components or separated into additional components. For example, the local memory 20 and the main memory storage device 22 may be included in a single component. Additionally, the image processing circuitry 26 (e.g., a graphics processing unit (GPU)) may be at least partially included in the processor core complex 18 and/or the display.

As depicted, the processor core complex 18 is operably coupled to the local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific processors (ASICs), one or more field programmable logic arrays (FPGAs), or any combination thereof. Furthermore, as previously noted, the processor core complex 18 may include one or more separate processing logical cores that each process data according to executable instructions.

In addition to the executable instructions, the local memory 20 and/or the main memory storage device 22 may store the data to be processed by the cores of the processor core complex 18. Thus, in some embodiments, the local memory 20 and/or the main memory storage device 22 may include one or more tangible, non-transitory, computer-readable media. For example, the local memory 20 may include random access memory (RAM) and the main memory storage device 22 may include read only memory (ROM), rewritable non-volatile memory such as flash memory, hard drives, optical discs, and the like.

As depicted, the processor core complex 18 is also operably coupled to the network interface 24. In some embodiments, the network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network. In some embodiments, the network interface 24 includes one or more antenna arrays configured to communicate over network(s) connected to the electronic device 10.

Additionally, as depicted, the processor core complex 18 is operably coupled to the power source 25. In some embodiments, the power source 25 may provide electrical power to one or more component in the electronic device 10, such as the processor core complex 18, the electronic display 12, and/or the network interface 24. Thus, the power source 25 may include any suitable source of energy, such as a rechargeable lithium polymer (Li-poly) battery and/or an alternating current (AC) power converter.

Furthermore, as depicted, the processor core complex 18 is operably coupled to the I/O ports 16. In some embodiments, the I/O ports 16 may enable the electronic device 10 to receive input data and/or output data using port connections. For example, a portable storage device may be connected to an I/O port 16 (e.g., universal serial bus (USB)), thereby enabling the processor core complex 18 to communicate data with the portable storage device. In some embodiments, the I/O ports 16 may include one or more speakers that output audio from the electronic device 10.

As depicted, the electronic device 10 is also operably coupled to input devices 14. In some embodiments, the input device 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio. For instance, the captured audio may be used to create voice memorandums. In some embodiments, voice memorandums may include a single-track audio recording.

Additionally, in some embodiments, the input devices 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. For example, the electronic display 12 may be used to display a voice memorandum application interface for a voice memorandum application that may be executed on the electronic device 10. In some embodiments, the electronic display 12 may be a display using liquid crystal display (LCD), a self-emissive display, such as an organic light-emitting diode (OLED) display, or the like.

As depicted, the electronic display 12 is operably coupled to the processor core complex 18 and the image processing circuitry 26. In this manner, the electronic display 12 may display image frames based at least in part on image data generated by the processor core complex 18 and/or the image processing circuitry 26. Additionally or alternatively, the electronic display 12 may display image frames based at least in part on image data received via the network interface 24 and/or the I/O ports 16.

Figure 2:
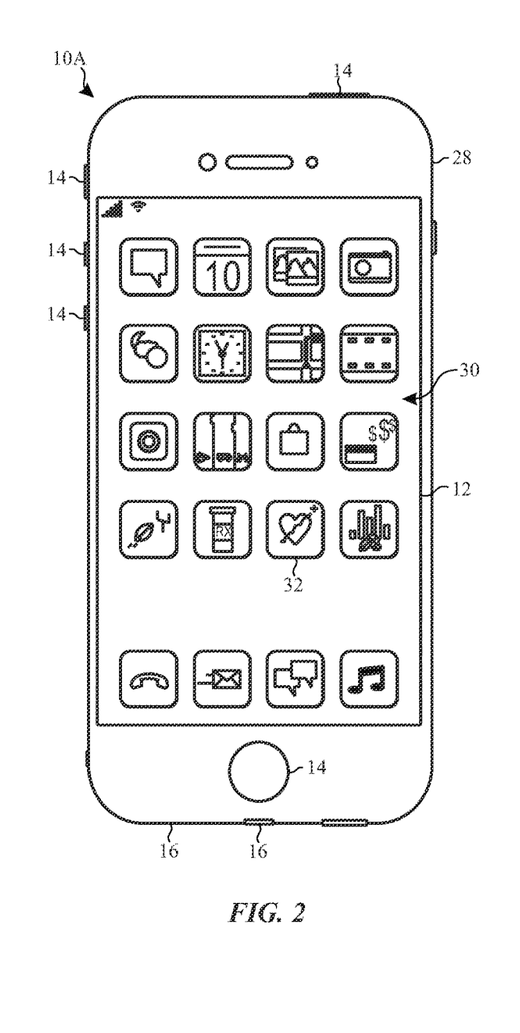
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

As depicted, the handheld device 10A includes an enclosure 28 (e.g., housing). The enclosure 28 may protect interior components from physical damage and/or shield them from electromagnetic interference. Additionally, as depicted, the enclosure 28 surrounds at least a portion of the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

Furthermore, as depicted, input devices 14 may extend through the enclosure 28. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. As depicted, the I/O ports 16 also extends through the enclosure 28. In some embodiments, the I/O ports 16 may include an audio jack to connect to external devices. As previously noted, the I/O ports 16 may include one or more speakers that output sounds from the handheld device 10A.

Figure 3:
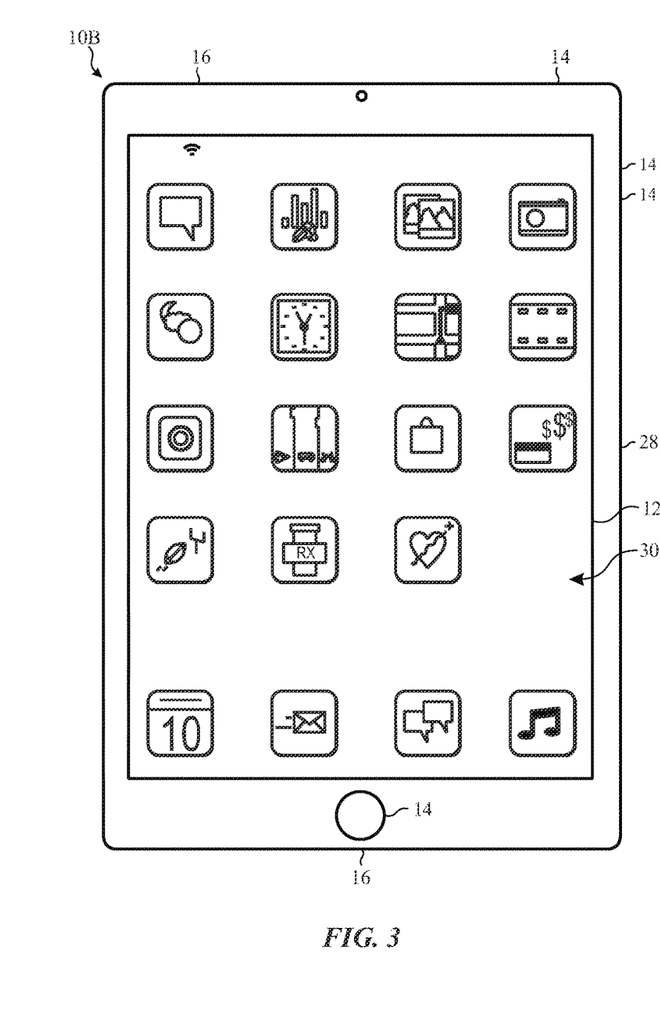
FIG. 3 is another example of the electronic device of FIG. 1, in accordance with an embodiment of the present disclosure.
Figure 4:
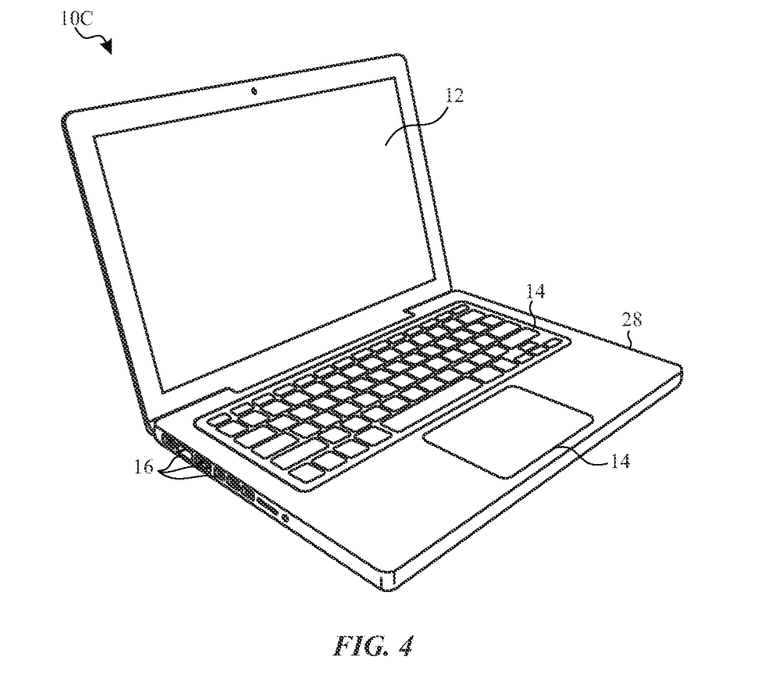
FIG. 4 is another example of the electronic device of FIG. 1, in accordance with an embodiment of the present disclosure.
Figure 5:
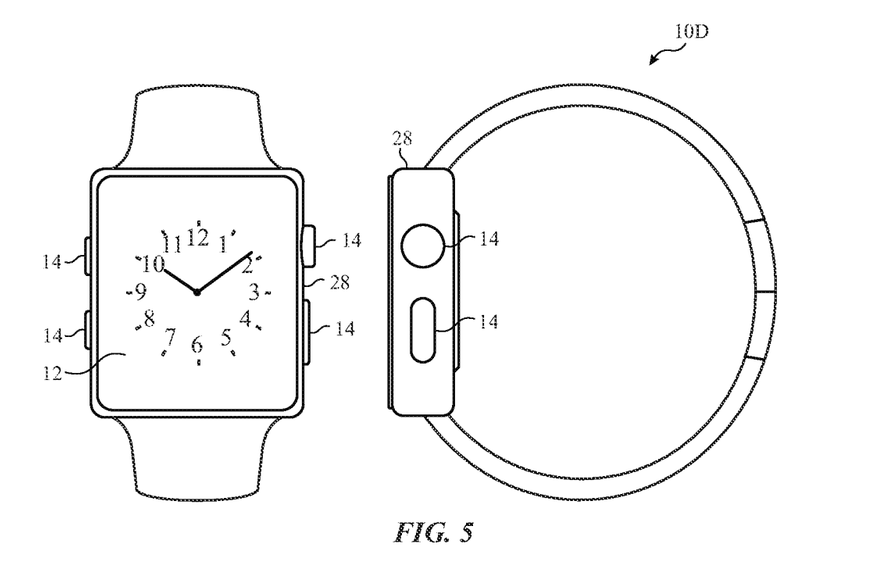
FIG. 5 is another example of the electronic device of FIG. 1, in accordance with an embodiment of the present disclosure.

To further illustrate an example of a suitable electronic device 10, specifically a tablet device 10B, is shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 28.

Partial Beam Correspondence

When the electronic device 10 communicates, as a user equipment (UE) device, in a wireless network, the electronic device 10 may receive signals using receiving beams and may transmit signals using transmission signals. As previously disclosed, a beam correspondence (BC) may allow the electronic device 10 to assign a corresponding transmitter beam and NBC prevents such associations. Given the complexity and limitation of radio frequency (RF) front end design and calibration, the BC may be achieved within a tolerance in a partial correspondence scheme. In other words, instead of saying that beams are the same or completely different, similar beams may be grouped together with a partial correspondence. Using these similar beams to relieve the burden of RF design and calibration, the user equipment (UE), such as the electronic device 10, may sweep a smaller set of similar beams around a direction assumed from a downlink RS.

Figure 6:
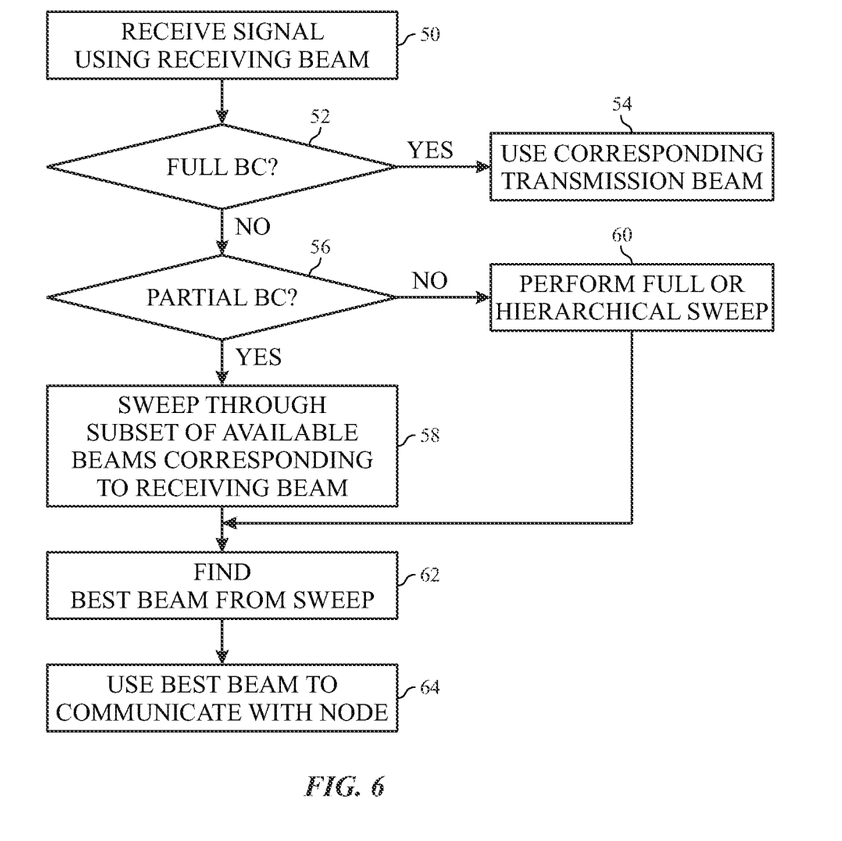
FIG. 6 is flow diagram of a process used to perform sweeping of transmitter signals of the electronic device of FIG. 1, in accordance with an embodiment of the present disclosure.

FIG. 6 shows a flow diagram that may be used to determine which transmitter beam to use in communication by the electronic device 10. The electronic device 10 receives a signal via a receiving beam (block 50). The signal may include downlink information from a wireless network. When the electronic device 10 has full BC enabled (block 52), the electronic device 10 uses a corresponding transmitter beam to communicate with the wireless network (block 54).

However, if partial BC is enabled for the electronic device 10 (block 56), the electronic device 10 sweeps through a subset of its available transmitter beams that are similar to and/or correspond to the receiving beam (block 58). If partial BC is not enabled, the electronic device sweeps through all available transmitter beams using a full sweep or a hierarchical sweep (block 58). As discussed below, the hierarchical sweep includes a coarse sweep of less than all transmitter beams with gaps between coarse transmitter beams and a refining sweep that covers interposing beams between the coarse transmitter beams.

Regardless of which type of beam sweeping is performed, the electronic device 10 and/or the network finds a best beam from the swept beams (block 62). The electronic device 10 then uses the best beam from the swept beams to communicate with the network via a network node (block 64).

Figure 7:
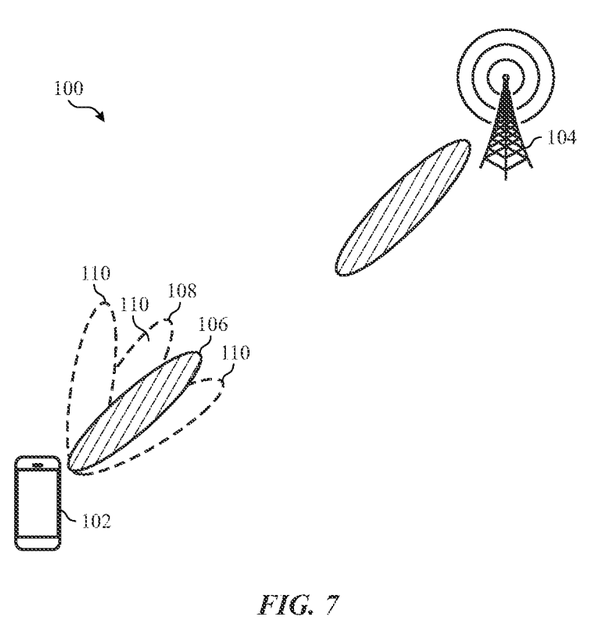
FIG. 7 illustrates communications between the electronic device and the gNB using partial beam correspondence, in accordance with an embodiment of the present disclosure.

As illustrated, FIG. 7 shows a communication 100 between a UE 102 (e.g., the electronic device 10) and a gNB 104 using a receiving beam 106. A corresponding single transmitter beam 108 may be identified with full BC, but with partial beam correspondence relaxed from a one-to-one correspondence, multiple transmitter beams 110 may be identified as being part of a subset of beams that correspond to the receiving beam 106. This smaller set of beams may be scanned to improve the uplink quality by directly using beam 108 with only a small amount of beam management overhead and achieve enhanced performance by sweeping a larger set of beams but less than all beams with reduced power consumption and/or latency in the transmission.

Exposure Limitation

Figure 8:
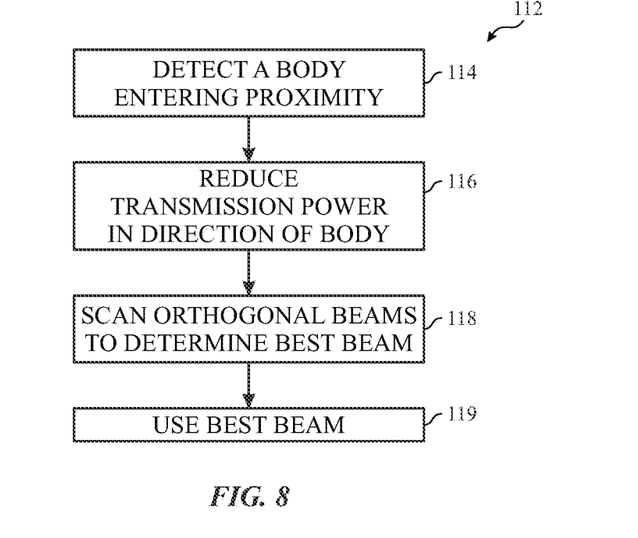
FIG. 8 is a flow diagram of a process used to perform limited sweeping of the electronic device of FIG. 1 to limit exposure, in accordance with an embodiment of the present disclosure.

When a body is in proximity of a (millimeter wave) transmitter, a regulatory limitation on the maximum permissive exposure (MPE) for RF radiation for the body. As depicted in a process 112 of FIG. 8, the UE 102 detects that a body enters the proximity (block 114). Even after body blocking of the path of communication, the downlink beam based on downlink RS measurements may still be helpful even. In such cases, the gNB 104 may still schedule uplink transmissions assuming beam correspondence for this direction. However, the UE 102 backs off the transmission power such that there may be a better transmitter beam for this direction (block 116). In such cases, it would be more efficient for the UE 102 to sweep a few orthogonal directions to the downlink RS in the case of asymmetric downlink and uplink beams (block 118). Use best beam from swept beams for communications with the gNB 104 (block 119). For instance, the swept beams may include full-power orthogonal directions along with the reduced power initial direction with the selection corresponding to the strongest connection path between the UE 102 and the gNB 104.

Figure 9:
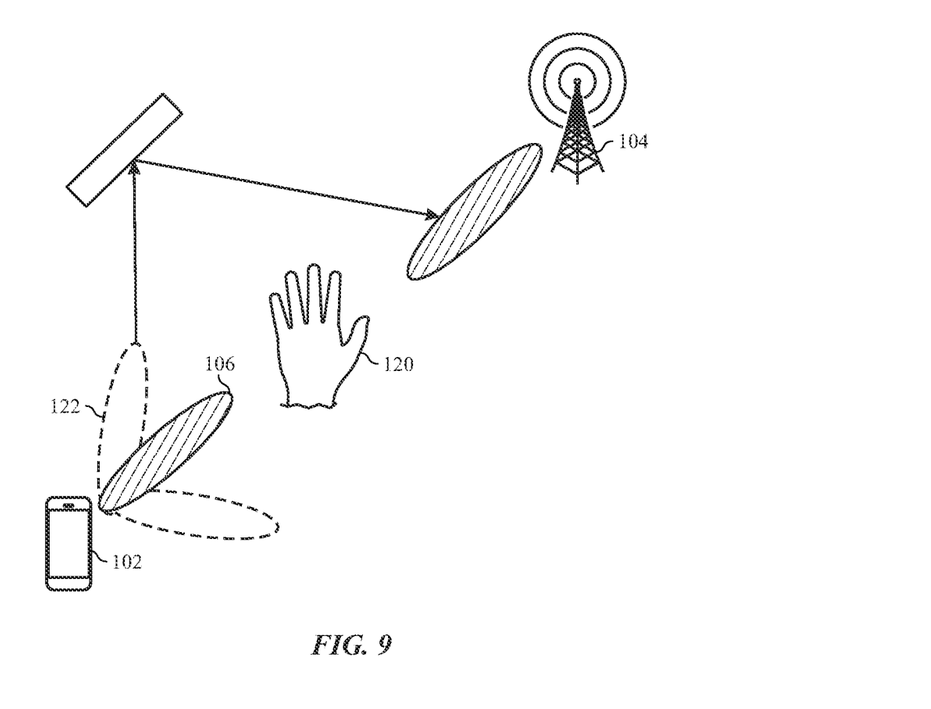
FIG. 9 illustrates communications between the electronic device and the gNB with a body entering a path between the electronic device and the gNB, in accordance with an embodiment of the present disclosure.

FIG. 9 illustrates communication between the UE 102 and the gNB 104 using the receiving beam 106. However, a body 120 blocks transmission directly back to the gNB 104 from the UE 102 thereby causing the UE 102 to lower power of the transmission pointed at the body 120. Instead, the UE 102 may scan orthogonal transmitter beam(s) 122 to determine a best beam to communicate with the gNB 104 including the lower power initial transmitter beam.

Efficient Beam Sweep

Figure 10:
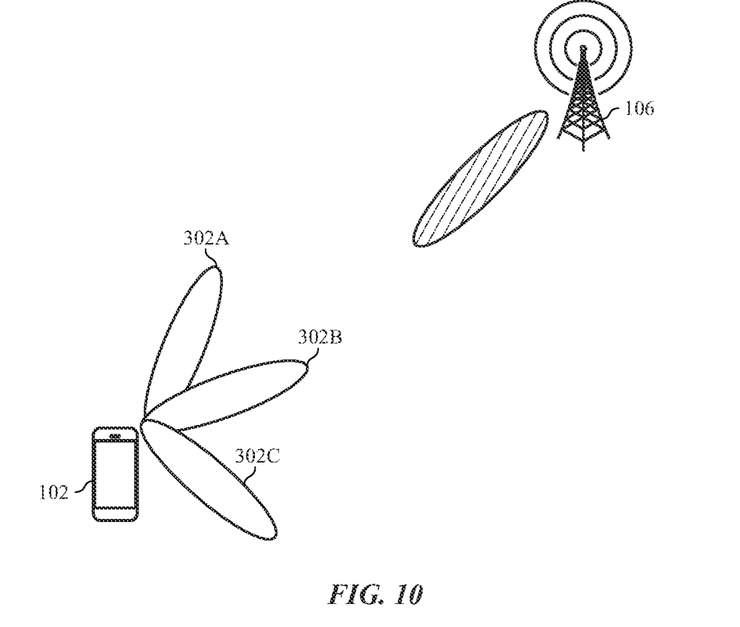
FIG. 10 illustrates a coarse beam sweep of spaced-apart beams, in accordance with an embodiment of the present disclosure.
Figure 11:
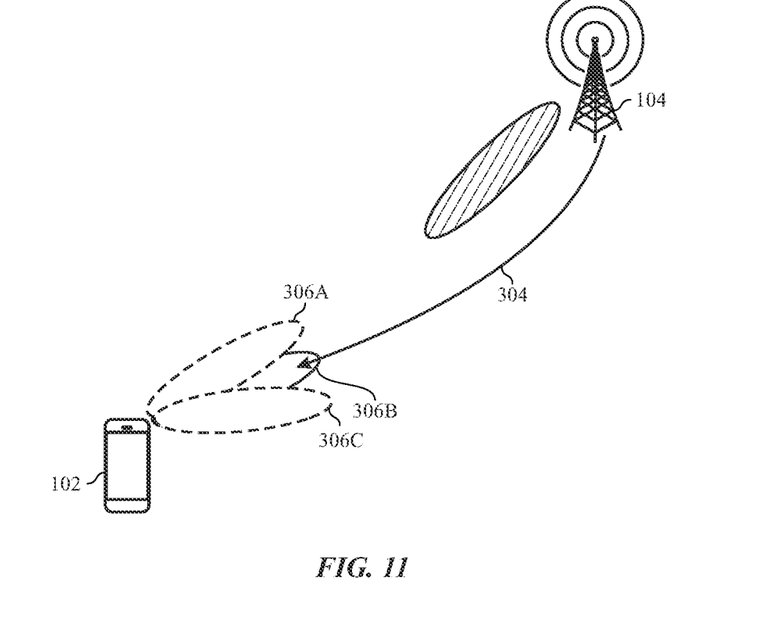
FIG. 11 illustrates a selection of a subset of the spaced-apart beams of FIG. 8 and transmission of interposing beams between the spaced-apart beams, in accordance with an embodiment of the present disclosure.

When the UE 102 does not support beam correspondence, it transmits a large number of sounding reference signals (SRS) to sweep transmitter beams for uplink beam selection. This complete sweep may include a long latency to sweep all possible transmitter beams, especially for the initial transmitter beam selection. Furthermore, many of the beams, such as those pointed away from the gNB 104, may not add helpful information in the sweeps. Thus, at least a portion of the transmitter beams may be omitted in beam refinement/tracking. Instead, a hierarchical beam search may be used. For instance, FIGS. 10 and 11 show steps of a hierarchical search that may be used to reduce UE 102 transmitter beam search overhead. As illustrated in FIG. 10, the UE 102 starts transmitting SRS with spaced-apart beams 302 skipping at least some possible beams to provide a coarse pattern. The gNB selects a subset of SRSs and associated uplink transmitter beams 302, such as beam 302B. As illustrated in FIG. 11, the gNB 104 then sends an indication 304 of the selection to the UE 102. Based on this selection, the UE 102 transmits a small set of SRSs with corresponding uplink transmitter beams 306 pointing around each SRS overall with closer spacing between the transmitter beams 306 than between the transmitter beams 302 reducing a number of SRSs and beams swept through during beam selection.

Release 15 has no SRS design to support configuring a small subset of SRS referenced by another SRS. In Release 15, an SRS may only be configured with the spatial relation with one other SRS when they are transmitted by the same transmitter beam. Instead, as discussed herein, the spatial relation to another SRS may be relaxed to configure a small set of SRSs pointing to a similar direction of the referenced SRS to identify a smaller subset to scan through during next beam change the coarse scan rather than scanning through all beams.

Multiple SRS transmissions (and associated transmitter beams) may be configured corresponding to an RS (e.g. SSB, CSIRS or SRS). The spatial filters for these SRS transmissions may be derived from the RS but may be different transmissions. The gNB 104 upon measuring more than one transmitted SRS for a reference RS may select a best transmitter beam and signal the UE 102 for the uplink transmission.

Figure 12:
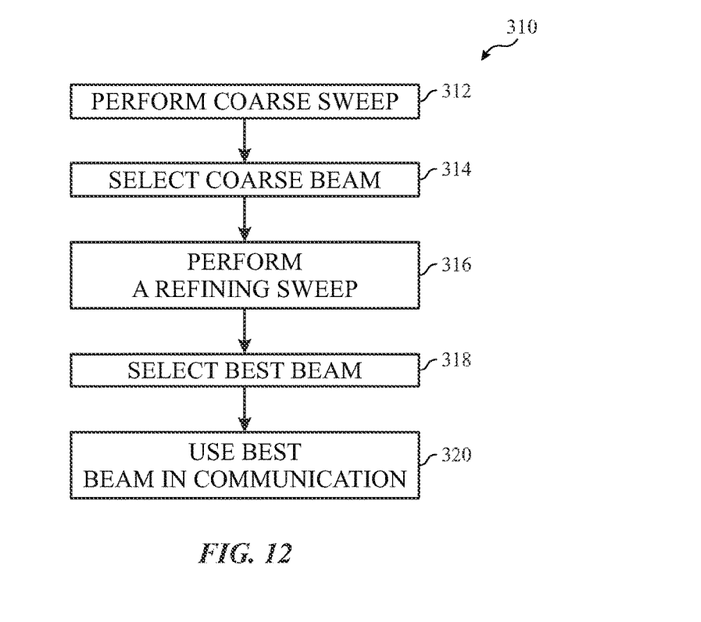
FIG. 12 is a flow diagram of a process used to perform a hierarchical sweep using the spaced apart beams of FIG. 10 and the interposing beams of FIG. 11, in accordance with an embodiment of the present disclosure.

FIG. 12 is a flow diagram of a process 310 that may be used with the UE 102 to perform a hierarchical sweep as previously discussed when no BC exists for the UE 102. The UE 102 performs a coarse sweep skipping at least some beams (block 312). Select a coarse beam based on the coarse sweep (block 314). This selection may be performed using the UE 102 making the determination directly or via the UE 102 receiving an indication of the selection of the gNB 104 causing the UE 102 to select the coarse beam. Using beams similar to the coarse beam, perform a refining sweep of a subset of available beams for the UE (block 316). The subset of available beams may include interposing beams between the beams of the coarse sweep. In some embodiments, the refining sweep may include the coarse beam and/or the information related to the coarse beam may be stored from the coarse sweep. The UE 102 and/or the gNB 104 selects a best beam based at least in part on the subset of available beams (block 318). The best beam may include the coarse beam or any of the subset of the available beams. The UE 102 then uses the best beam in communication with the gNB 104 (block 320).

Multiple SRS Resources for a Same Spatial Relation

Currently, according to Release 15, when two SRS resources have a same spatial relation, they are both transmitted by a same transmitter beam. For example, if two SRS resources have the same spatial relation to a downlink RS (e.g., SSB or CSIRS), both SRS resources are both transmitted by a transmitter beam equivalent to the receiving beam of the downlink RS. In another example, if SRS resources have the same spatial relation to another uplink SRS, they are both transmitted by the same transmitter beam. In other word, under the current definite scheme, a spatial relation exclusively defines a transmitter beam.

To enable the UE 102 to sweep its uplink beams around a RS (or direction), a spatial relation may be modified to indicate that the beams are related/similar rather than exclusively corresponding to the same transmitter beam. For instance, when an SRS resource is set with a spatial relation to a downlink RS (SSB/CSIRS), the SRS resource is transmitted by a transmitter beam related to the receiving beam of the reference downlink RS (SSB or CSIRS). Additionally or alternatively, at least one of the SRS resources with such a spatial relation may be transmitted by the transmitter beam equivalent to the receiving beam of the downlink RS. Additionally or alternatively, when an SRS resource is set with a spatial relation to an uplink SRS, the SRS resource is transmitted by a transmitter beam related to the transmitter beam of the reference SRS.

By such a modified spatial relation, multiple SRS resources with a same spatial relation can be transmitted in different beams to improve the search efficiency and accuracy. The gNB 104 configures multiple SRS resources with a modified spatial relation to a same RS (e.g. SSB, CSIRS, or another SRS) for the UE 102. The gNB 104 further configures the SRS resources with the same modified spatial relation in beam management SRS resource sets. For example, when the RS is a SSB or a CSIRS, a UE 102 can use the transmitter beams around the direction of downlink RS by beam correspondence within a tolerance level. For another example, when the RS is a SRS, the UE 102 can use the transmitter beams around the direction of the reference SRS for beam tracking/refinement.

The gNB 104 can either configure the beam management SRS resource set(s) to be periodic or semi-persistent, or request the SRS resource set(s) in a download control information (DCI). For an RS, the gNB 104 measures more than 1 SRS transmissions with the same spatial relation to the RS but using different transmitter beams and selects the best SRS transmitted (or the associated transmitter beam) for the uplink. The gNB 104 may still set a SRS resource indicator (SRI) in the DCI for the uplink grant corresponding to the best transmitter beam as selected for the uplink.

SRS with Spatial Relation and an Additional Field

In addition to or alternative to modifying the spatial relation in Release 15, new fields may be added to ensure proper interpretation even by legacy UEs 102. For multiple SRS resources with a same spatial relation, each SRS resource may have a unique ID, and a new field may indicate if this spatial relation is strict or not. For instance, when a "strictRelation" field is set to false, the UE 102 is allowed to use a related spatial filter instead of the same spatial filter. Additionally or alternatively, a new information element (IE) may be configured as a "spatial similarity" instead of "spatial relation." When an SRS resource is configured with a spatial similarity IE, the UE 102 may apply a spatial filter pointing to a direction similar to the reference RS for any similar SRS resources.

Multi-Beam SRS

Figure 13:
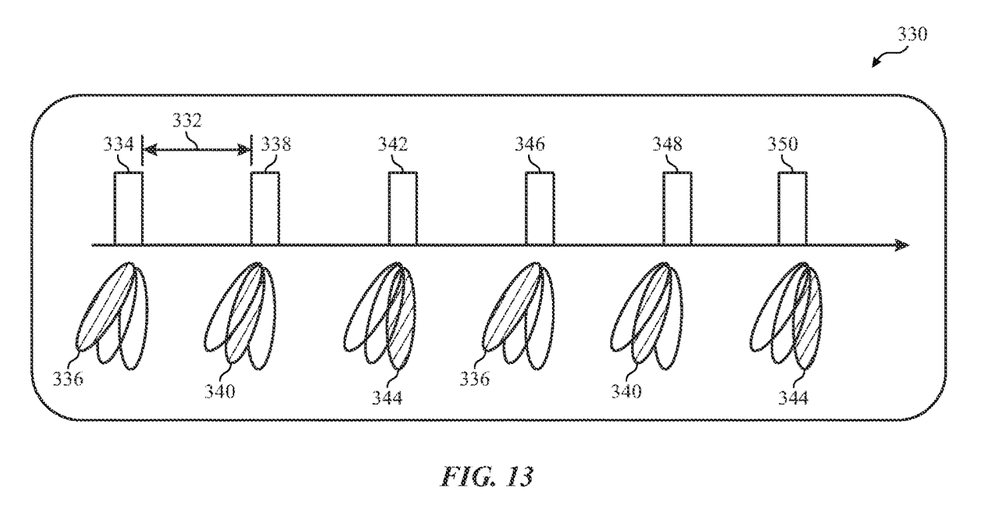
FIG. 13 a timing diagram for beam sweeping with periodic or semi-persistent sounding reference signals (SRS), in accordance with embodiment of the present disclosure.

As previously noted, in Release 15, a SRS resource is associated with a particular beam and resource allocation. As an extension suitable for the disclosure herein, a SRS resource with a defined spatial relation to an RS may be configured with a new field indicating a number of different beams the UE 102 may use to transmit the SRS. In some embodiments, this field may be set with a default value (e.g., 1) when omitted. FIG. 13 illustrates a timing diagram 330 with periodic or semi-persistent SRSs occurring every period 332. In each period 332, the UE 102 may use a different beam, up to N different beams, where N is given in the field. For instance, in period 334, the UE 102 uses a first transmitter beam 336. In period 338, the UE 102 uses a second transmitter beam 340. In period 342, the UE 102 uses a third transmitter beam 344. Then, the UE 102 returns back to the first transmitter beam 336. In other words, in respective periods 346, 348, and 350, the UE 102 may use respective transmitter beams 336, 340, and 344. Additionally or alternatively, the field can further indicates a different index for each beam to identify the beams 336, 340, and 340 directly.

Figure 14:
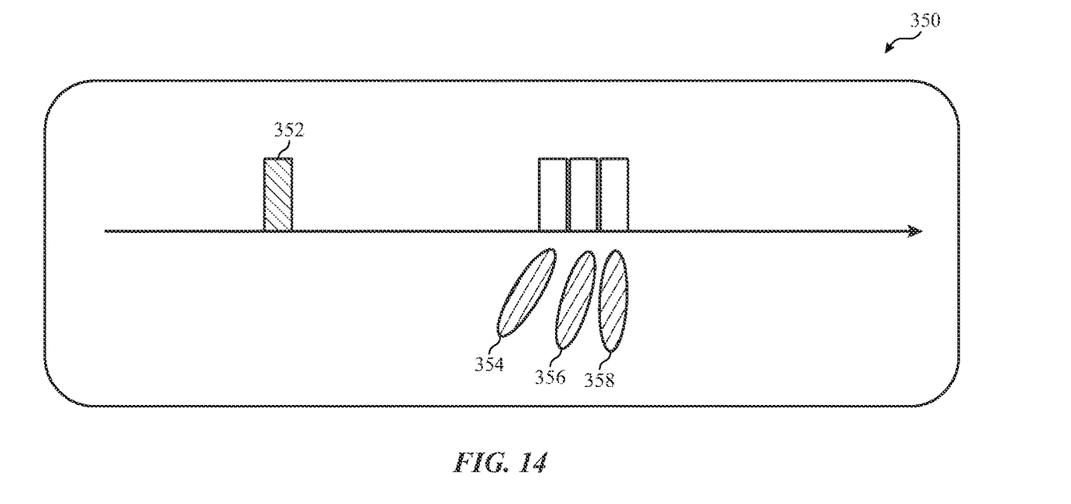
FIG. 14 is a timing diagram for beam sweeping with aperiodic SRSs with consecutive OFDM symbols), in accordance with embodiment of the present disclosure.

As illustrated in FIG. 14, for aperiodic SRSs, the field may indicate the UE 102 can transmit the SRS in N consecutive orthogonal frequency-division multiplexing (OFDM) symbols, where a different beam is used for each OFDM symbol. As illustrated in the timing diagram 350, an SRS request 352 in the DCI is made. In consecutive OFDM symbols after the SRS request 352, beams 354, 356, and 358 are consecutively used.

Figure 15:
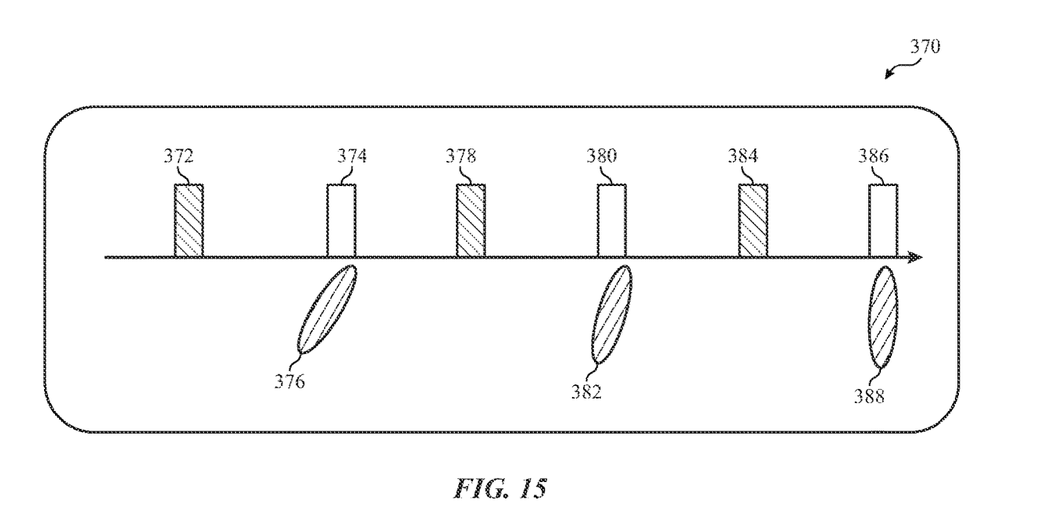
FIG. 15 is a timing diagram for beam sweeping with aperiodic SRSs using an indexed sub-beams), in accordance with embodiment of the present disclosure.

Additionally or alternatively, for aperiodic SRS, the SRS request may include a beam index indicating a specific beam. As illustrated in FIG. 15, an SRS request 372 in DCI may also indicate a sub-beam index causing the UE 102, at time 374, to use a beam 376. Similarly, an SRS request 378 in DCI may also indicate the sub-beam index causing the UE 102, at time 380, to use a beam 382. Furthermore, an SRS request 384 in DCI may also indicate the sub-beam index causing the UE 102, at time 386, to use a beam 388.

Using one of the foregoing timing examples to schedule an uplink transmission, a scheduling request indicator (SRI) may be extended to indicate the number of transmitter beams of the SRS. Alternatively, a number of beams in SRS transmission in the set can be signaled in a media access control-control element (MAC-CE) or radio resource control (RRC).

Number of Beams Corresponding to an RS

When multiple transmitter beams are swept around a downlink RS by beam correspondence, the number of beams depends on the BC tolerance. When multiple transmitter beams are swept around a reference SRS for beam tracking, the number of beams depends on the codebook design of UE 102.

The UE 102 may inform the gNB 104 about the target number of beams to sweep around a RS based on a number of available similar beams. The UE 102 may request the number of SRSs for each spatial relation in RRC signaling. For example, UE 102 capability signaling or new a SRS resource request information element may be used to indicate the number. This number of SRS resources for different spatial relations may be signaled, since the number of SRS resources for different spatial relations may be different for different spatial relations. Alternatively, this number may be omitted from signaling if all spatial relations have a same number of SRS resources. In some embodiments, the UE 102 can have event-triggered or measurement-based RRC signaling to request an update of the number of SRS for each spatial relation.

Scheduling Multiple Beam Sweep for a RS

For network efficiency, the gNB 104 may not allow the UE 102 to sweep more than one beam for an RS at least at some times. For example, the gNB 104 may schedule the UE 102 to transmit an SRS corresponding to multiple CSIRS using BC first, then allow the UE 102 to transmit multiple SRS corresponding to a particular CSIRS.

When SRS resources corresponding to a same and/or similar RSs have unique resource IDs, the gNB 104 may configure multiple SRS resource sets. Some SRS resource sets contain SRS resources each with a spatial relation to different RSs. Other SRS resource sets may each contain multiple SRS resources with a spatial relation to a same reference RS. Adoption of this scheme may include using more SRS resource sets to be configured and may increase the maximum number of SRS resource sets.

When an SRS resource contains more than 1 transmitter beam, the gNB 104 may use additional signaling to activate/deactivate the multiple beams for the same SRS. For example, for SRS resources with multi-beams in an aperiodic SRS set, the triggering SRS request field in DCI may have a bit added to activate/deactivate each beam of the multiple beams. Additionally or alternatively, for SRS resources with multi-beams in semi-persistent or periodic SRS set, the MAC-CE may be used to activate/deactivate each of the multiple beams for the SRS set or signal the number of beams that are available to be activated.

Related UE Capabilities

Capabilities of the UE 102 may be defined corresponding to each or some of the UE 102 features previously described. For example, a max number of SRS resources per spatial relation may be indicated in the capabilities of the UE 102. The capabilities of the UE 102 may indicate that the UE 102 supports spatial relation strictness or spatial similarity. The capabilities of the UE 102 may indicate that the UE 102 supports multi-beam SRS and/or a max number of SRS resources per spatial relation. The capabilities of the UE 102 may include additional and/or alternative capabilities of the UE 102 that may be pertinent to convey to the gNB 104 in any of the foregoing techniques.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f).

However, for any claims containing elements designated in any other manner, it is intended that such elements are not to be interpreted under 35 U.S.C. 112(f).

What is claimed is:

1. A method, comprising:
    transmitting a downlink reference signal to a user equipment electronic device (UE) from a wireless network node;
    receiving, at the wireless network node and from the UE, transmissions using at least one beam of a subset of available transmitter beams corresponding to the downlink reference signal;
    selecting a selected beam of the subset of available transmitter beams via the wireless network node by transmitting an indication of the selection from the wireless network node to the UE; and
    receiving, at the wireless network node, a plurality of beams that includes the selected beam and additional beams between beams in the subset of available transmitter beams.

2. The method of claim 1, wherein the subset of available transmitter beams corresponds to the downlink reference signal according to a spatial relation between a direction of receipt of the downlink reference signal at the UE and a direction of transmission of the subset of available transmitter beams.

3. The method of claim 1, wherein the transmissions include transmitting sounding reference signals transmitted using the subset of available transmitter beams.

4. The method of claim 3, wherein the subset of available transmitter beams corresponds to respective sounding reference signals that correspond to the downlink reference signal.

5. The method of claim 4, wherein the sounding reference signals comprise a field indicating a number of the available transmitter beams in the subset.

6. The method of claim 5, comprising switching from partial beam correspondence to full beam correspondence by setting the number to one in the sounding reference signals.

7. The method of claim 1, wherein selecting the selected beam comprises measuring more than one received sounding reference signal via the subset of available transmitter beams and selecting the selected beam as the strongest received sounding reference signal.

8. The method of claim 1, wherein the additional beams are between the selected beam and beams of the subset of available transmitter beams that are adjacent to the selected beam.

9. The method of claim 1, comprising transmitting, from the wireless network node to the UE, a selection of a strongest beam from the selected beam and the additional beams.

10. The method of claim 9, comprising receiving data transmissions at the wireless network node from the UE using the strongest beam.

11. A system, comprising
    one or more antennas; and
    one or more transmitters coupled to the one or more antennas and that are configured to:
        transmit a reference signal to a user equipment electronic device (UE),
        based on the transmission of the reference signal, receive a coarse sweep of coarse transmitter beams from the UE, the coarse sweep including a pattern of the coarse transmitter beams that skips at least some transmitter beams,
        transmit a coarse selection signal selecting a coarse beam from the pattern,
        based on the coarse selection signal selecting the coarse beam, receive a refining sweep with interposing beams of the transmitter beams between the coarse transmitter beams,
        based on the refining sweep, transmitting a best beam signal to select a best beam from the interposing beams or the selected coarse beam, and
        communicate with the UE using the best beam.

12. The system of claim 11, wherein the coarse beam is the strongest beam of the coarse transmitter beams.

13. The system of claim 11, wherein no beam correspondence exists between a beam receiving the reference signal and any transmitter beam of the UE, and the transmission of the coarse transmitter beams includes swept uplink transmitter beams in multiple directions from the UE.

14. The system of claim 11, wherein the sweep of the coarse transmitter beams are transmitted on consecutive periods of transmission for periodic sounding reference signals (SRSs) and the sweep of the interposing beams are transmitted on consecutive periods of transmission for periodic SRSs.

15. The system of claim 11, wherein the sweep of the interposing beams comprises the interposing beams consecutively transmitted in consecutive orthogonal frequency-division multiplexing (OFDM) symbols after a sounding reference signal (SRS) request is made in a downlink control information (DCI) signal for aperiodic SRSs.

16. An electronic device, comprising:
    a network interface of a wireless network node configured to communicate with a user equipment device (UE), the network interface being configured to
        transmit a transmitted downlink reference signal to the UE,
        based on the transmitted downlink reference signal, receive a pattern of possible transmitter beams from the UE, wherein the pattern comprises transmitter beams near a direction corresponding to the transmitted downlink reference signal,
        transmit a selection of at least one transmitter beam of the pattern to the UE, and
        use the at least one transmitter beam to communicate with the UE; and
    a processor that is coupled to the network interface and is configured to select the at least one transmitter beam of the pattern as the selection based at least in part on signal strength.

17. The electronic device of claim 16, wherein the pattern is based on a partial beam correspondence using sounding reference signals (SRSs) associated with a direction used to receive the transmitted downlink reference signal.

18. The electronic device of claim 17, wherein the SRSs include a field to indicate how many SRS resources may be associated with a single beam.

19. The electronic device of claim 16, wherein the pattern is in multiple directions about the UE based on a lack of beam correspondence.

20. The electronic device of claim 19, wherein using the at least one transmitter to communicate with the UE comprises receiving a refining sweep of transmitter beams based on the at least one transmitter beam, transmitting a refined selection of a refined beam from the refining sweep, and using the refined beam to perform communications between the UE and the electronic device.

* * * * *